March 9, 1971  E. J. SHARPE  3,568,328
AIRCRAFT COMPASS

Filed July 1, 1968  2 Sheets-Sheet 2

INVENTOR.
EDGAR J. SHARPE

BY *Fetherstonhaugh & Co.*

ATTORNEYS

United States Patent Office 3,568,328
Patented Mar. 9, 1971

3,568,328
AIRCRAFT COMPASS
Edgar John Sharpe, Willowdale, Ontario, Canada, assignor to Patrick Harrison & Company Limited, Toronto, Ontario, Canada
Filed July 1, 1968, Ser. No. 741,429
Int. Cl. G01c 17/08
U.S. Cl. 33—223                                    4 Claims

ABSTRACT OF THE DISCLOSURE

This invention relates to a magnetic compass especially suited for aircraft. The magnet is universally mounted so that it can rotate in azimuth and in dip and the azimuth axis is made pendulous so that it is normally vertical. With compasses of this kind the pendulous azimuth axis tends to swing out of control to beyond the 90° dip position as the aircraft turns. If the dip of the magnet exceeds 90°, the universal mounting means for the magnet operate to bring the magnet around into the resultant magnetic field and at the same time they turn the compass card of the magnet through 180°. The result is that the compass reads 180° out after such a misalignment and is entirely unreliable to a pilot. This invention overcomes this difficulty by counteracting the magnet about its dip axis by means of a weight. The weight is designed to counteract dip and has a magnitude sufficient to prevent the magnet from exceeding the 90° dip position in an aircraft turn. A compass constructed according to the invention is very much more stable than the standard aircraft magnetic compass. It also has better characteristics from a vibration point of view when used in a heavy vibration machine, such as a helicopter.

This invention relates to a magnetic compass specially suited for aircraft use.

The common aircraft magnetic compass comprises a skirt like compass card which is pivotably mounted to rotate in azimuth under the influence of a magnet that is mounted usually near its lower extremity and below the pivot point. The skirted compass card is usually liquid damped and a datum or reference line is carried by the compass casing. The skirt assembly of necessity must have a weight large enough and a centre of gravity low enough to prevent the needle from dipping under level conditions in order to give a reading of azimuth. This compass is generally unsatisfactory in an aircraft turn. The reason is that the centre of gravity of the compass card assembly is substantially lower than their pivot point. There is inherent imbalance and the centrifugal force that is applied to them as an aircraft goes into a turn is large enough to cause the card assembly to tilt with the result that it rotates to an extent and in a direction depending on the course of the aircraft, the angle of tilt, and the "dip" of the resultant magnetic field. Thus, stand-by magnetic compasses are usually considered unserviceable during tight aircraft turns because factors other than azimuth direction play too great a part in the reading. Additionally under conditions of heavy vibration, such as those encountered in a helicopter, the compass card becomes unstable to read.

Other types of compass constructions are known. For example, in the United States patent to C. G. Abbott No. 1,533,683 and in Italian Pat. No. 267,869, a compass construction is illustrated which shows the magnet needle mounted for universal movement about its centre of gravity. With such a mounting it is possible to minimize the effects of centrifugal force, but no one before this invention has succeeded in providing a compass construction using this type of mounting for the magnetic element suitable for aircraft use. The compass arrangements shown in the Abbott and the Italian patent appear to have been intended for use on ships where a view of the instrument is achieved from above and where centrifugal force problems in connection with the pendulous parts are not as great as those encountered in aircraft use.

Moreover, with the Abbott and the Italian patent construction it is necessary to have a plan view of a 360° dial in use. They are, therefore, generally speaking not adapted for mounting in an aircraft where the compass card usually rotates through 360° but where only a portion of the compass card is viewed at a time through a transparent window in the casing.

The difficulty with mounting a magnet for universal movement about its pivotal axis and providing a datum line that relates to a compass card carried by the magnet to indicate azimuth is the centrifugal force on the parts in areas where there is substantial dip to the magnet. In these areas there is a tendency for the dip of the magnet to exceed 180° as a result of centrifugal force under turn conditions. When this occurs the universal mounting within which the magnet is mounted tends to rotate to bring the magnet back to its normal position of dip aligned in the magnetic field. If this corrective action of the gimbals within which the magnetic member is mounted takes place before the magnet can itself realign with the correct dip under turn conditions, then the compass card is turned around through 180° so that the compass card reads north when it should read south after the aircraft comes out of the turn and the compass settles down with the magnet member properly aligned with the magnetic field. Such a circumstance is entirely unreliable in an aircraft, especially coming out of a turn where the pilot tends to be somewhat confused and wants to rely on his compass.

This invention overcomes this difficulty with a universally mounted magnet member.

It is, therefore, an object of this invention to provide a magnetic compass for aircraft use that is stable under turn conditions.

It is a further object of the invention to provide a magnetic compass that is stable under conditions of heavy vibration.

It is a still further object of the invention to provide a magnetic compass that can be easily read on an instrument panel.

It is a further object of the invention to provide a reliable magnetic compass that can be manufactured at an economical price.

Figure 1:
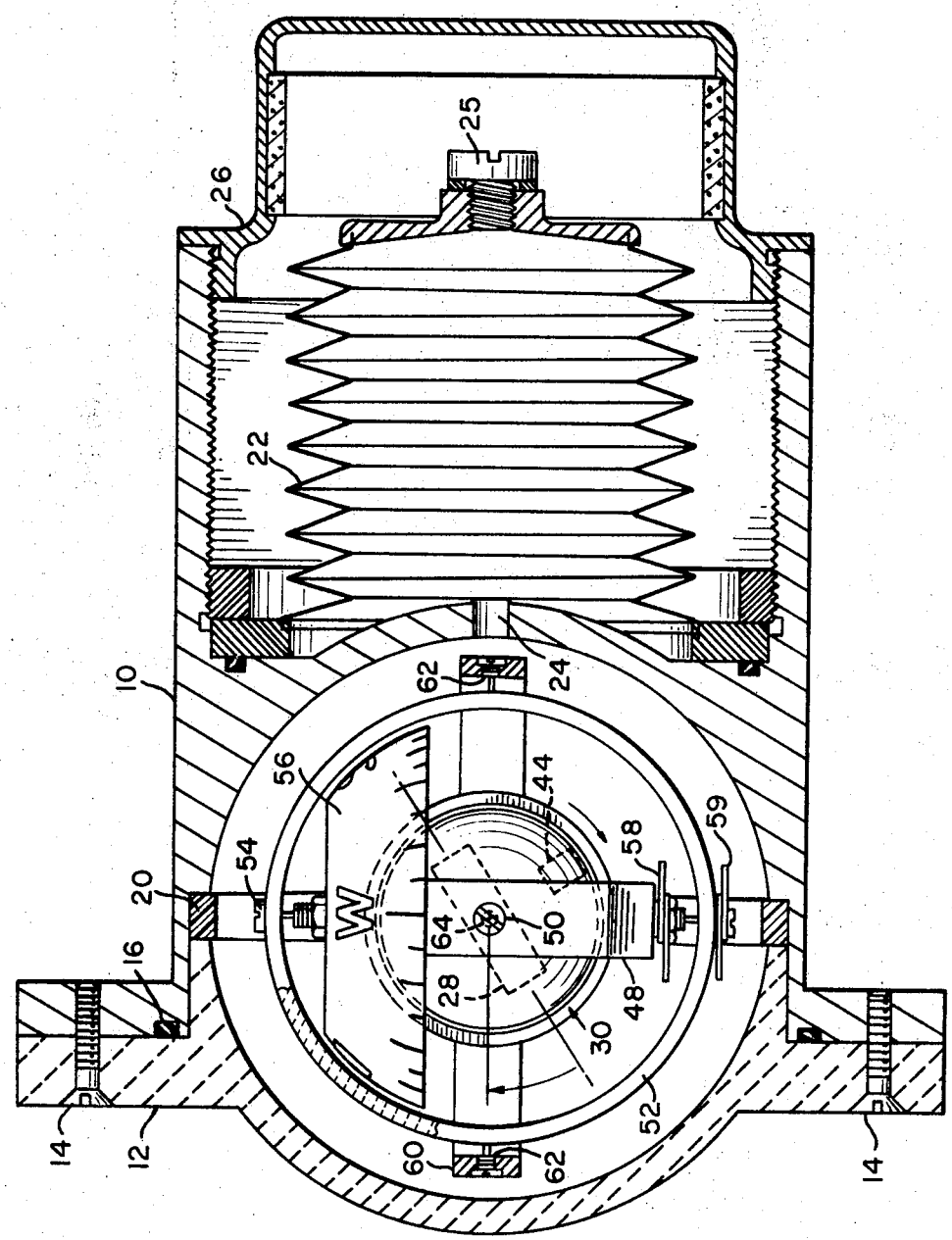
FIG. 1 is a cross-sectional view of a compass according to this invention.

The compass illustrated in the drawings has a two piece casing that consists of an aluminum housing 10 and a transparent plastic cover 12 held together at their flanged edges by means of spaced apart bolts 14. A sealing ring 16 is provided to achieve a perfect seal for the interior of the casing which, as will be explained later, is filled with a damping fluid.

Figure 2:
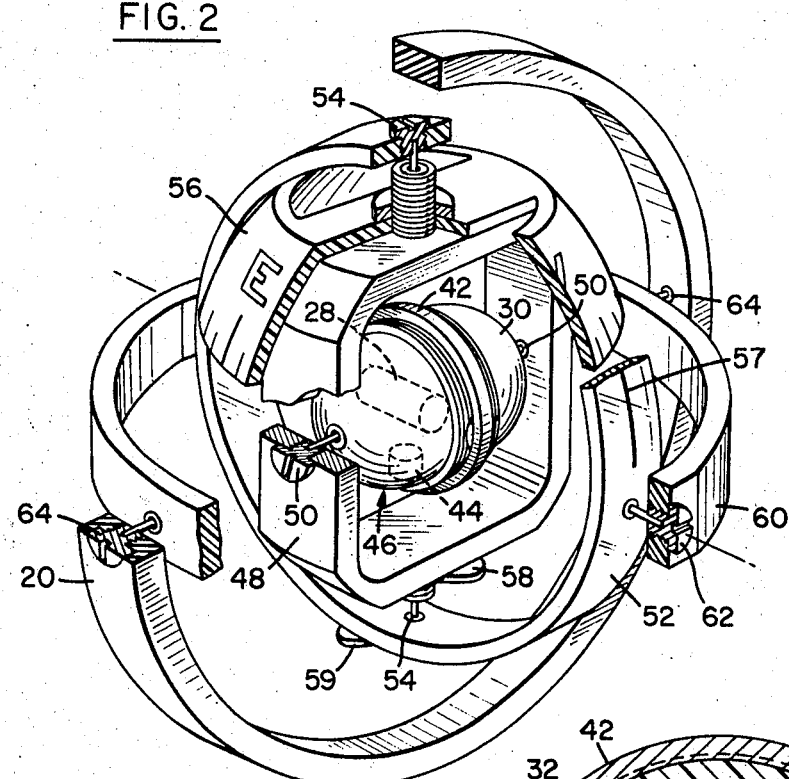
FIG. 2 is a perspective illustration partly broken away of the magnet carrier member and its suspension.
Figure 4:
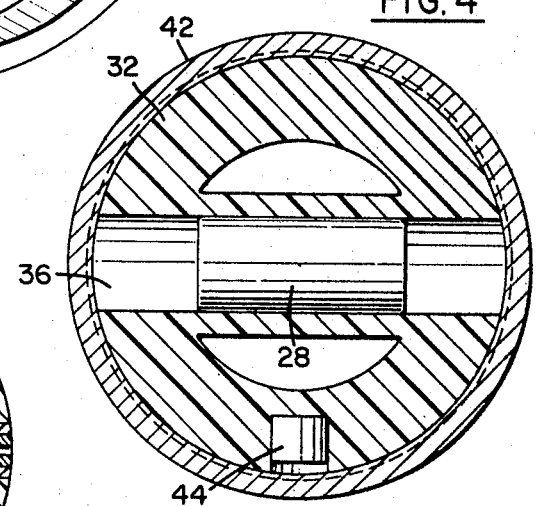
FIG. 4 is a sectional view along the line 4—4 of FIG. 3.
Figure 3:
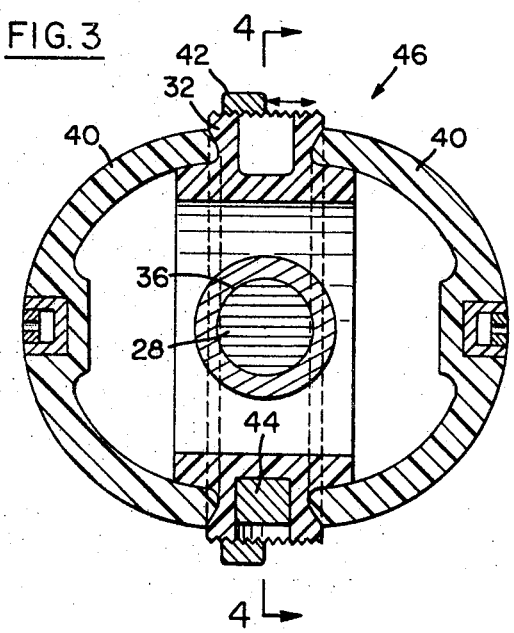
FIG 3 is a sectional view of the magnet carrier member.

The magnetic member and its suspension, generally illustrated in FIG. 2, is clamped into the casing by means of the mounting ring 20.

All of the moving parts of the compass are designed to have a similar specific gravity that is as close as possible to the specific gravity of the damping fluid that fills the interior of the compass casing, so that they are as near as possible neutrally buoyant. As will be explained later, it is necessary that some of the parts be maintained vertical in the gravitational field, and in this respect a minimum weight is applied to these parts to maintain them vertical. However, this weight is maintained at a minimum in order to minimize the gravitational effect on the weighted part in aircraft turns. It will be noted that the interior of the casing communicates with an expandable bellows 22 through an opening 24. The interior of the casing and the bellows 22 are filled with a damping liquid. Expansion and contraction of the liquid with changes in temperature is accommodated by expansion and contraction of the bellows 22. The liquid is admitted to the interior of the casing through the filling cap 25, access to which is achieved by removing the end cap 26 of the casing.

The magnetic assembly is generally indicated in FIG. 1 and, as indicated above, it includes a ring 20 by which it is mounted within the casing as described above. The magnet 28 of the assembly is mounted in a magnet carrier shell member 30. Magnet carrier shell member 30 includes a plastic disk 32 having a through bore 36 into which the magnet 28 is inserted by means of a press fit so that the magnet is centrally located therein and the centre of gravity of the magnet is at the centre of the round plastic disk 32. A pair of similar cooperating shells 40 are cemented to the opposed edges of the disk 32 to constitute a hollow magnet carrier member. A balancing ring 42 threads onto the outer edge of the disk 32 and can be adjusted laterally of the composite magnet carrier member for mechanical balance. Magnet carrier shell member 30 is made hollow so that its specific gravity is approximately the same as the specific gravity of the other moving parts of the magnetic assembly.

A dip weight 44 is press fit into a hole on the underside of the ring 32 with its centre of gravity on a line joining the centre of gravity of the weight 44 and the centre of gravity of the magnet 28 and at right angles to the longitudinal axis of the magnet. Dip weight 44 is of very substantial importance in stabilizing the compass under turn conditions, as will be fully explained later.

The magnet carrier assembly, which will be generally indicated by the numeral 46, is rotatably mounted within the pendulous vertical ring 48 about a dip axis that passes through the centre of gravity of the magnet 28 thereof by means of a pair of opposed bearing assemblies, generally indicated by the numeral 50 on FIG. 2. The gimbal ring 48 in turn is rotatably mounted within the pendulous vertical ring 52 by gimbal means of a pair of opposed bearing assemblies 54 about an azimuth axis that extends through the centre of gravity of the magnet member 28. Thus, the magnet carrier assembly 46 is supported about a pair of mutually perpendicular axes to support the magnet 28 for free movement in the earth's magnetic field about its centre of gravity. The magnet 28 will thus tend to align in both azimuth and dip with the resultant magnetic field.

Magnet carrier assembly 46 and ring 48 are mechanically balanced as they are assembled. Thus, ring 42 is adjusted so that it is mechanically balanced in its mounting in all directions, ring 48 is symmetrical and also mechanically balanced if necessary within its mounting.

The numeral 56 refers to a compass card adapted to indicate azimuth, and it is rigidly mounted on ring 48.

It will be apparent that if an accurate indication of azimuth is to be achieved ring 48, within which the magnet member 28 is supported and which carries a compass card 56, must be maintained vertical. Weights 58 and 59 are provided for the purpose of aligning the axis of bearings 54 pendulously in the vertical gravitational field. Weights 58 and 59 consist of lugs which can be turned about the shaft upon which they are mounted for the purpose of mechanically balancing the unit. They can be used to balance, for example, ring 48 and ring 52 if necessary.

The ring 52 is in turn universally mounted so that the azimuth axis through the bearings 54 can be maintained in a vertical position whereby to maintain the azimth axis and the compass card 56 in a vertical position and to achieve an accurate reading of azimuth, as indicated by the magnet 28. In this respect ring 52 is mounted in the horizontal gimbal ring 60 in opposed bearings 62 about an axis that passes through the centre of gravity of the magnet member, and ring 60 is in turn mounted for rotation in ring 20 by means of a pair of opposed bearing members 64 about an axis that extends through the centre of gravity of the magnet member. In order to achieve an accurate reading of azimuth, the axis through bearings 54 must be maintained vertical, and the above noted weights 58 and 59 are mounted under rings 48 and 52 for this purpose. These weights are of just sufficient magnitude to maintain the axis that extends between bearings 54 vertical under steady horizontal conditions.

In order to assemble the compass, the magnetic assembly, generally indicated in FIG. 2, is assembled and mechanically balanced. In this connection adjustment of ring 42 on magnet carrier assembly 46 and rotation of weights 58 and 59 is possible to achieve mechanical balance. The parts are symmetrical and should be close to balance without adjustment. Following mechanical balance, the magnet 28 is magnetized and the unit is assembled within the casing illustrated in FIG. 1. After mounting the magnet assembly in the casing, the unit is filled with a damping fluid. The moving parts of the mechanical assembly, that is, the magnet carrier shell member, the rings and compass card, are made of plastic and are each of a specific density that is as closely as possible equal. The shell member is hollow and designed with a size to achieve this end. The specific gravity of each of the moving parts is about 1.2 and an organic liquid about this gravity is used as a damping liquid. As indicated above, weights 58 and 59 are adapted to maintain the ring 52 and ring 48 in a vertical position whereby the magnet member will indicate azimuth by means of a compass card 56 on the datum line 57, which is etched on the clear plastic ring 52.

As indicated above, this compass is designed for aircraft use, and a difficulty with magnetic compasses when used in aircraft is that under turn conditions the centrifugal force on the compass parts, including the compass card and magnet, tend to rotate these parts so that the resultant earth's magnetic field loses control of the magnet and the compass does not give an accurate reading. With a magnet mounted for universal movement about its centre of gravity the centrifugal force on the magnet tends to be reduced, but it cannot be eliminated because there must be weights 58 and 59 which normally and under steady horizontal conditions maintain the datum line and compass card vertical. These weights are quite small but they do tend to be subject to centrifugal force during turns and to swing outwardly. As they do so, they of course carry the magnet 28 with them and increase the dip of the magnet to beyond the true dip of the resultant magnetic field. In regions in the order of 45° latitude north of the equator, this increase in dip under turn conditions tends to carry the magnet to a dip in excess of 90° from the horizontal. If the re-alignment of the magnet with the resultant magnetic field is not fast enough, the universal mounting of the magnet carrier shell operates to re-align the magnet in the magnetic field with its proper magnetic dip, with the result that the ring 48 turns within its bearings through 180° and the compass card then is 180° in error in its reading. This is a very serious thing to a pilot coming out of a turn when he especially wants to rely on his compass for accuracy.

To overcome this possibility of having the dip of the magnet member 28 exceed 90° from the horizontal in turn conditions, the weight 44 is added. It is adapted to act against the tendency of the compass magnet 28 to dip and to reduce the dip to an extent such that the centrifugal effects on the compass parts during the turn cannot carry the compass magnet to a dip condition where it exceeds the vertical dip position, i.e. 90° from the horizontal. This in effect prevents the compass card from slipping around through 180° due to this cause.

Weight 44, then, has a magnitude that prevents the magnet from dipping through 90° from the horizontal under turn conditions. For example, at about 45° latitude the normal dip of the magnet member is about 76° from the horizontal. Under some turn conditions this will cause the compass card to turn through 180° for the reason explained above. Weight 44 acts to shift the normal dip of the magnet member from about 76° to between 40° and 50° under normal conditions at this latitude. If the dip of the magnet member is adjusted so that it is between 40° and 50° from the horizontal at about 45° latitude, then the swing of the axis between the bearings 54 during turn conditions is not likely to be more than 90° in any region of the earth with a well designed compass where the weights 58 and 59 are not in excess of what is required to maintain verticality of the axis between the bearings 54 and where the parts of the magnet assembly are balanced and are in an appropriate damping fluid that has a specific gravity similar to the specific gravity of the matched moving parts.

The magnitude of weight 44 will depend upon the strength of the magnet and the balance of the compass parts. In addition to the centrifugal force on the compass parts which tends to swing the compass needle to a dip position greater than 90° in the polar regions, there is the tendency of a strong magnet to align with the magnetic field under changing conditions of direction. A strong magnet may tend to over-correct as it tries to align with the resultant field in a turn and in over-correcting may swing beyond the 90° dip position. Whatever the cause of exceeding the 90° dip position, the cure is the same, that is, weight the magnet member with a weight 44 so that the over 90° dip position is avoided under all turn conditions in all flying areas. It has been found that a weight of about .028 gram for a 40,000 gauss oersted magnet at a distance of about 8 millimeters from the centre of the magnet is sufficient to counteract against the dipping force of the magnet and maintain the compass card steady during turn conditions in aircraft in all areas of the globe. It will, of course, be apparent that at the equator the dip of the magnet member is 0 and there is no need to correct for this effect. However, aircraft fly all over the globe and a compass that is satisfactory at the equator is hardly a satisfactory compass from all points of view. To overcome the problem the magnet carrier assembly is made pendulous about the dip axis to counteract against the dipping force of the magnet and prevent the magnet from dipping through the vertical dip position under the influence of the pendulous effect on dip in turn conditions in all global areas. Given the criterion there is no difficulty in applying it to get the result in any given compass design.

It will be noted from the drawing that the magnet carrier shell member 30 is non-spherical and that the drag of the liquid upon it can be varied by varying its external shape. An elongated shape has been found suitable as shown in the present illustrative embodiment.

In the compass illustrated, the magnet 28 is a platinum cobalt type of magnet having a diameter of ⅛ inch and a length of ¼ inch. It has an energy product of 40,000 gauss oersteds. The weight 44 is as indicated above .028 gram and it is located 8.5 mm. from the centre of gravity of the magnet. The combined weights 58 and 59 are .24 gram and their average distance from the centre of the magnet is 15 mm. These dimensions are all dependent upon specific design.

The important thing in this compass is that the magnet assembly 46 be pendulous about the dip axis between the bearings 50 to counteract against the dipping force of the magnet in the magnetic field. To counteract against the dipping force in both hemispheres with equal effect, the centre of gravity of the magnet carrier assembly must underlie the dip axis to be pendulous and be on a line through the centre of gravity of the magnet that is at right angles to the longitudinal axis of the magnet. From the mechanical point of view the dipping weight arrangement as illustrated is thought to be preferred. All parts can be easily balanced but alternatives will be apparent to those skilled in the art. For example, a reasonable result could probably be obtained by mounting the magnet 28 of the magnet carrier assembly 46 just below the dip axis and dispensing with weight 44. This would have the effect of making the magnet member pendulous about the dip axis and by careful arrangement of weights, it could probably be arranged to counteract against the dipping force to prevent the magnet from dipping through a vertical dip position under turn conditions.

It is intended that such modifications to the inventive concept of making the magnet carrier pendulous to counteract dipping force and prevent dipping through the vertical position under turn conditions should be within the scope of this invention and that the specification should not be read in a limiting sense.

What I claim as my invention is:
1. An aircraft compass comprising in combination:
 (a) a casing filled with damping liquid and having a transparent window;
 (b) dual gimbal means in said housing and immersed in the damping liquid and comprising a horizontal gimbal ring mounted in the housing for pivotal movement about a first horizontal axis in the earth's gravitational field, a first vertical gimbal ring supported by the horizontal gimbal ring for pivoting about a horizontal axis perpendicular to said first horizontal axis, and a second vertical gimbal ring supported by said first vertical gimbal ring for movement in the earth's magnetic field about a vertical pivot axis;
 (c) a magnet carrier assembly comprising a hollow magnet carrier member supported on horizontal bearings by the second vertical gimbal ring, a magnet enclosed within said member and having a line joining its poles disposed normal with respect to an axis through said bearings, and a weight carried by the carrier member below the magnet and located to urge it toward horizontal orientation, the buoyancy of the magnet carrier assembly being selected to be substantially neutral in said liquid; and
 (d) magnet card means and datum line means carried respectively by the vertical gimbal ring opposite said window, and weight means positioned on the vertical gimbal rings to impart pendulosity there to level the card means and erect the datum line means and said vertical pivot axis.

2. In a compass as set forth in claim 1, said weight in said carrier assembly being located directly below the center of said line joining the poles of said magnet when the latter is horizontal.

3. In a compass as set forth in claim 1, said taxes of said gimbal rings and magnet carrier bearings intersecting at the center of gravity of said magnet.

4. In a compass as set forth in claim 1, said hollow carrier member being non-spherical.

References Cited

UNITED STATES PATENTS

| | | | |
|---|---|---|---|
| 1,306,882 | 6/1919 | Clarke | 33—223 |
| 1,533,683 | 4/1925 | Abbot | 33—222.6 |

FOREIGN PATENTS

| | | | |
|---|---|---|---|
| 120,625 | 11/1918 | Great Britain | 33—222.6 |
| 267,869 | 9/1929 | Italy. | |
| 161,478 | 11/1957 | Sweden | 33—222.6 |

ROBERT B. HULL, Primary Examiner